(12) United States Patent
Yilmaz

(10) Patent No.: US 8,559,148 B2
(45) Date of Patent: Oct. 15, 2013

(54) SAFETY CIRCUIT FOR A HOUSEHOLD APPLIANCE

(76) Inventor: Namik Yilmaz, Istanbul (TR)

( * ) Notice: Subject to any disclaimer, the term of this patent is extended or adjusted under 35 U.S.C. 154(b) by 591 days.

(21) Appl. No.: 12/810,849

(22) PCT Filed: Nov. 27, 2008

(86) PCT No.: PCT/EP2008/066371
§ 371 (c)(1),
(2), (4) Date: Oct. 2, 2010

(87) PCT Pub. No.: WO2009/083351
PCT Pub. Date: Jul. 9, 2009

(65) Prior Publication Data
US 2011/0007440 A1 Jan. 13, 2011

(30) Foreign Application Priority Data
Dec. 27, 2007 (TR) ................ A2007/09032

(51) Int. Cl.
*H02H 3/00* (2006.01)
(52) U.S. Cl.
USPC ............................................. 361/90

(58) Field of Classification Search
USPC ............................................. 361/90
See application file for complete search history.

(56) References Cited

U.S. PATENT DOCUMENTS

| 3,825,778 A | 7/1974 | Ahmed |
| 4,736,082 A * | 4/1988 | Matsuo et al. ............... 219/626 |
| 5,175,413 A | 12/1992 | Holling et al. |
| 8,169,207 B2 * | 5/2012 | Omi ............................. 323/285 |

FOREIGN PATENT DOCUMENTS

| EP | 1530218 A | 5/2005 |
| JP | 10110945 A | 4/1998 |
| JP | 10334360 A | 12/1998 |

* cited by examiner

*Primary Examiner* — Stephen W Jackson
(74) *Attorney, Agent, or Firm* — Venable, Campillo, Logan & Meaney PC

(57) ABSTRACT

The present invention relates to a household appliance (1) comprising a control circuit (2) that maintains the electronic control and a safety circuit (3) that detects the errors in the control circuit (2) and cuts off the output of the circuit (2) in case an error occurs. The errors are detected by comparing the output of the control circuit (2) with a reference signal having a square wave form.

20 Claims, 3 Drawing Sheets

Figure 1:
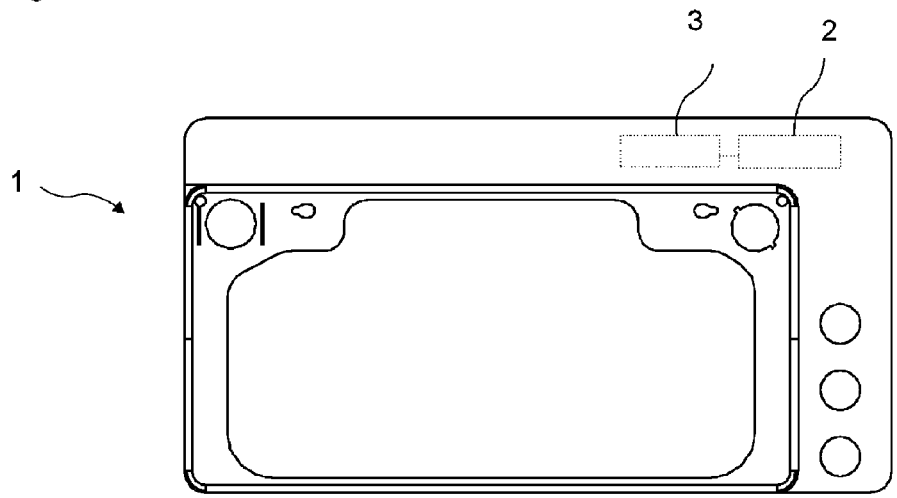

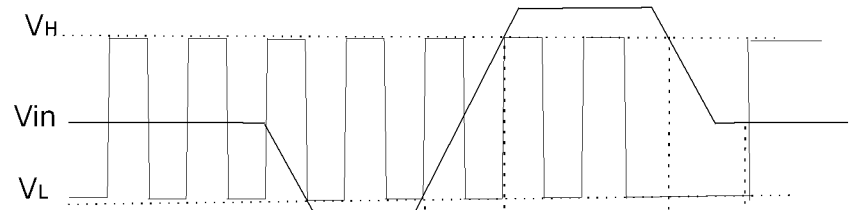
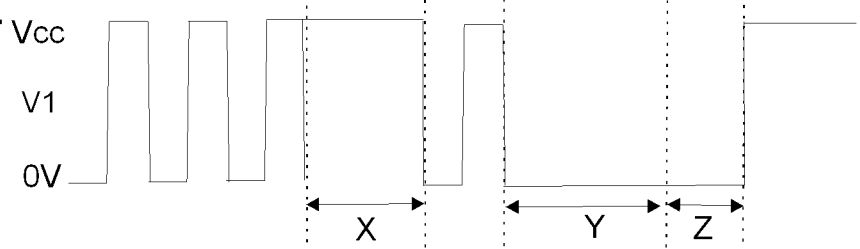
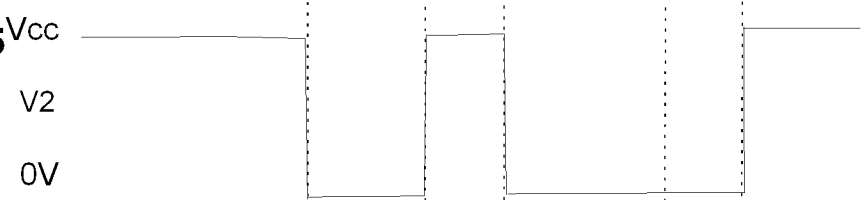
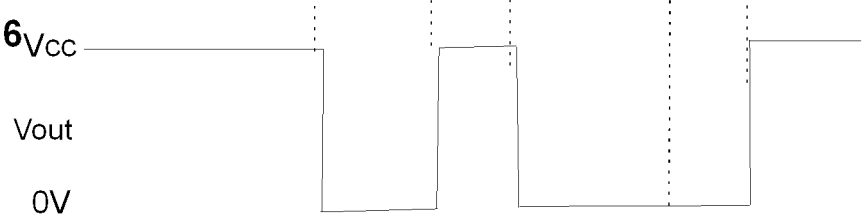

SAFETY CIRCUIT FOR A HOUSEHOLD APPLIANCE

The present invention relates to a household appliance comprising a safety circuit that detects the errors occurring in the control circuit.

The detection of possible errors in the circuits that electronically control household appliances is of vital importance for user safety. The smallest error in the circuits can cause the appliance to be ruined and the house to be burned together with it as well. The most frequent errors are malfunctioning or overheating of the circuit elements, short circuits and open circuits. Therefore, various precautions are taken for errors that happen in the circuits used in the household appliances. The circuit breakers selected depending on the feature of the circuit and control circuits placed at the inlet or outlet of the most critical elements of the circuit are the most implemented precautionary measures. The circuits were observed to be heated as a result of several errors. Safety is provided by closing the circuit, generally in the control of a microprocessor when temperature goes above nominal values in works carried out on the heat sensors positioned at various places. However, in existing safety circuits errors can happen that overrules the control circuit. In cases when the microprocessor also malfunctions, for example in case of short circuiting, these kinds of safety precautions are inefficient. Instead of using elements like a microprocessor, the software thereof also easily impaired, in safety precautions, using entirely hardware safety precautions is more effective. Moreover, in the IEC 60335-1 Safety rules standard (Safety of household and similar electrical appliances) it is required that the system should protect itself in case of two errors in the electronic circuit.

In the state of the art European patent document no EP1530218, the signal level corresponding to the measured temperature detector is monitored separately in the high level comparator and the low level comparator. If the signal is outside of determined limit values, the input values are changed. However, here in case of the comparators malfunction, then one of the high or low signals coming from the faulty circuit will not be detected and the circuit will continue to operate in error.

In the state of the art Japanese patent document no JP10334360, a safety circuit is explained wherein the circuit is closed by a microprocessor when the sensor signal is outside the range as a result of comparing the output signal and the benchmark signal having a certain range by the single level comparator. Since this comparator is monitored by the microprocessor, the safety is limited by the reliability of the microprocessor.

In another state of the art patent document U.S. Pat. No. 3,825,778 of the United States of America, a temperature sensitive switching circuit includes serially connected transistors that cuts off the output of the control circuit when the temperature increases for providing safety.

The aim of the present invention is the realization of a household appliance wherein the safety of the control circuit is maintained effectively without requiring a complex software.

The household appliance realized in order to attain the aim of the present invention, explicated in the first claim and the respective claims thereof, comprises a comparator that hardware-wise compares and regulates the momentary output signal of the control circuit with the benchmark signal having an expected voltage range at the exit of the circuit, a block circuit that converts the signal at the exit of the comparator to supply voltage if it is within determined values and cuts off if outside and a safety circuit that maintains the reliability control in two phases with a serial switching circuit, supplied from the same source as the control circuit.

The first phase is comprised of the comparator and the block circuit, the second phase of the switching circuit.

By selecting the benchmark signal in wave form, making an error is prevented when the control circuit supplied by the variable voltage source shows variability. Otherwise, the comparator detects the circuit signal to be different from the benchmark signal even though there is no error in the circuit. Therefore, in the embodiment of the present invention, the benchmark signal is not determined as single level but as a signal that changes between two levels. The output of the comparator changes depending on the output of the control circuit being between, above or below the low and high voltage values of the benchmark signal.

If the output voltage of the control circuit is between the low and high limit values of the benchmark signal then the output voltage of the control circuit is between desired limits and the output voltage of the comparator is equal to the benchmark signal voltage. This shows that the control circuit is operating without problems.

If the output voltage of the control circuit is less than the lower limit of the benchmark signal, a voltage equal to the supply voltage is seen at the output of the comparator. If the output voltage of the control circuit is more than the higher limit of the benchmark signal, the output voltage of the comparator is zero. These show that there is an error in the control circuit such as open circuit, short circuit, overheating, high pressure etc.

Moreover, if there is a degradation in the benchmark signal, the output voltage of the comparator is zero. Thus, the comparator finds out the errors both in the control circuit and in the benchmark signal.

The block circuit disposed at the exit of the comparator passes the regular signal seen at the comparator output by converting thereof into supply voltage and cuts off the other output signals of the comparator. Thus, the first phase of the reliability control is completed.

In an embodiment of the present invention, the block circuit is configured of capacitors and diodes. These convert the benchmark signal coming to inlet of the block circuit into supply voltage and deliver to the exit and cut off the signals coming as supply voltage or zero.

The switching unit, made up of at least two switches connected in series, implementing the second phase of the reliability control which is the subject matter of the embodiment of the present invention, is fed from the same variable source as the control circuit. It is used as the auxiliary safety control phase for detecting the errors by being connected to the exit of the control circuit that implements the first phase of the reliability control. When the switches detect the supply voltage at the exit of the block circuit, it is transmitted in exactly the same way, and cut off the output voltage necessary for the functioning of the control circuit when a different value is detected.

In an embodiment of the present invention, the switches used in the switching unit comprise serially connected transistors that are turned on only when the control circuit outputs the desired output voltage.

By means of the present invention, the safety precautions are increased by preventing every kind of error that can be seen in the control circuit such as short circuiting, open circuit, high temperature or high pressure.

The household appliance realized in order to attain the aim of the present invention is illustrated in the attached figures, where:

FIG. 1—is the schematic view of a household appliance.

Figure 2:
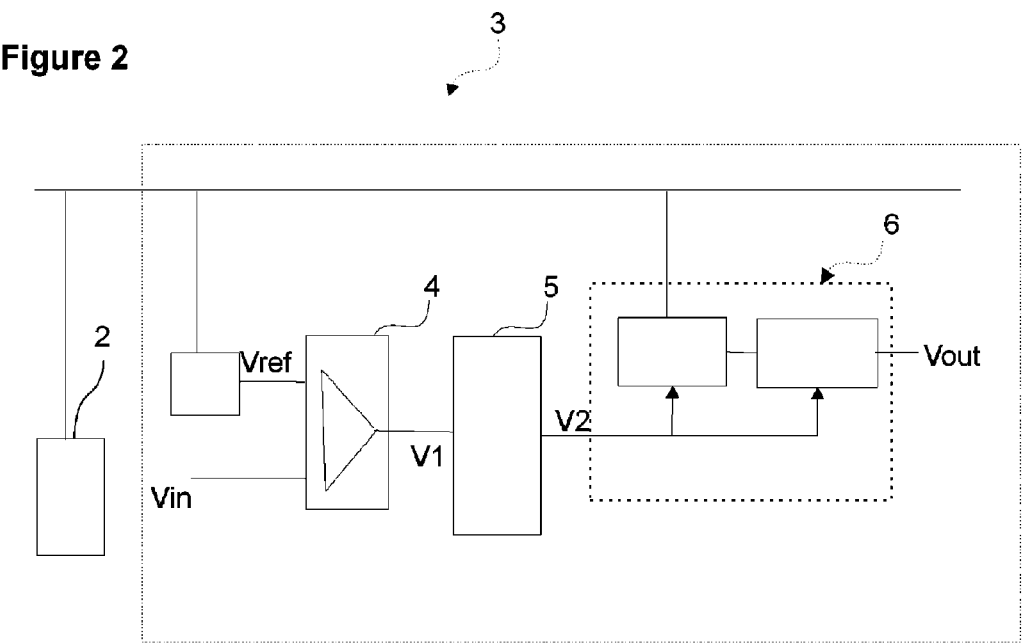

FIG. 2—is the schematic view of a safety circuit.

FIG. 3—is the graph showing the output voltage of the safety circuit and the benchmark signal values.

FIG. 4—is the graph showing the output voltage of the comparator.

FIG. 5—is the graph showing the output voltage of the block circuit.

FIG. 6—is the graph showing the output voltage of the switching circuit.

Figure 7:
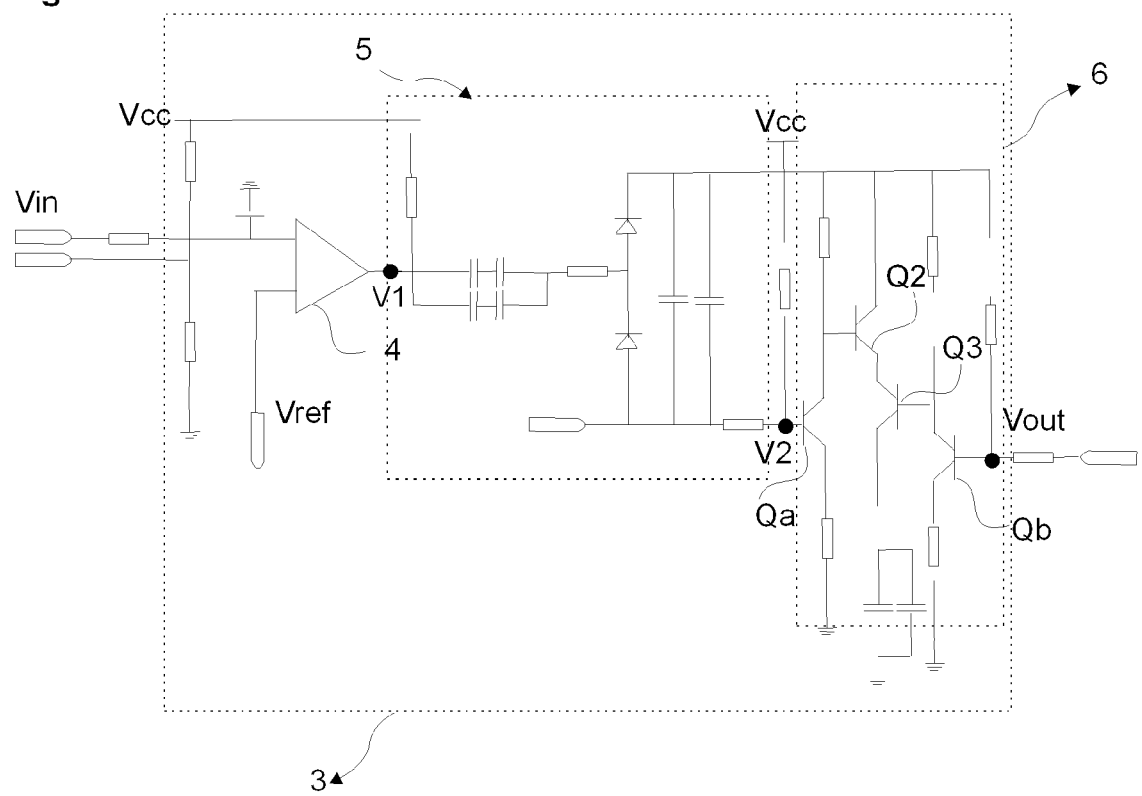

FIG. 7—is the schematic view of a safety circuit used in an embodiment of the present invention.

The elements illustrated in the figures are numbered as follows:

1. Household appliance
2. Control circuit
3. Safety circuit
4. Comparator
5. Block circuit
6. Switching unit A household appliance (1) comprises a control circuit (2) that maintains the electronic control and a safety circuit (3) that detects the errors in the control circuit (2) and cuts off the output of the control circuit (2) in case an error occurs.

The safety circuit (3) comprises a comparator (4) that compares the output voltage (Vin) of the control circuit (2) with a full wave form benchmark signal, having low ($V_L$) and high ($V_H$) limit values and a block circuit (5) that converts the output signal (V1) of the comparator (4) to supply voltage if within the determined values, and cuts off if outside and a switching unit (6) connected to the output (V2) of the block circuit (5), actuated with the same variable signal as the control circuit (2), and if the output voltage (V2) of the block circuit (5) is detected to be an unwanted value, then cuts off the output of the control circuit (2).

The safety circuit (3), maintains the first phase of the double-phase reliability control with the comparator (4) and the block circuit (5) and the second phase by the switching unit (6).

The safety circuit (3) is preferably disposed at the exit of the control circuit (2). Thus, when a problem occurs in any part of the control circuit (2) that controls the motor, fan, heater, display used in household appliances, the error will be determined at the exit of the control circuit (2). The benchmark signal used in the first phase for reliability control is formed as a full-wave signal having the voltage range expected to be seen under normal working conditions of the control circuit (2) fed by the variable voltage source. The full-wave signal has low ($V_L$) and high ($V_H$) high limit values in accordance with the fluctuations of the mains voltage. One inlet of the comparator (4), detecting the first error, is connected to the outlet of the control circuit (2) and the other inlet is connected to the benchmark signal.

As long as the circuit (2) output voltage (Vin) is within the low and high limit values ($V_L$ and $V_H$) of the benchmark, the output voltage (V1) of the comparator (4) will be equal to the benchmark. When an error occurs in the control circuit (2) there will be a degradation at the circuit output voltage (Vin), for example when there is short circuiting, will go above $V_H$ (Vin>$V_H$) and will go below the low limit value (Vin<$V_L$) when the output voltage (V1) of the comparator (4) is zero volt (Y range) or when short circuited and the output voltage (V1) of the comparator (4) will be equal to the supply voltage (Vcc) (X range). Moreover, if there is a degradation at the benchmark, the output voltage (V1) of the comparator (4) will be zero volt (Z range) (FIG. 4).

In the household appliance (1) of the present invention, the block circuit (5) disposed at the exit of the safety circuit (3) delivers the benchmark coming to its inlet as supply voltage (Vcc) to its outlet due to the clipping and amplification functions and cuts off the other signals (FIG. 5). The block circuit (5) is constituted of preferably capacitors that provide current and diodes that clip the unwanted voltages.

In the embodiment of the present invention, the switching unit (6) used as the safety control in the second phase is made up of two switches connected in series and is connected to the exit of the block circuit (5) for auxiliary safety control in case there is a problem in the first phase or if the block circuit (5) malfunctions. The series connected switches can be used as the backup of each other in order to maintain the safety standard. In case one of the switches short circuits, the other switch system continues to function. This switching unit (6) is supplied from the same variable signal as the control circuit (2). The switching unit (6) controls the block circuit (6) and cuts off the control circuit (2) in case there is an error.

In the preferred embodiment of the present invention, the switching unit (6) comprises control transistors that are turned on at the output voltage (Vin) values of the control circuit (2) expected to be seen, and is cut off in case there is an error in the control circuit (2) as a result of the degradation in the output voltage (Vin). In different embodiments of the present invention, other switching elements can be used instead of the control transistors.

In an embodiment of the present invention, the switches used in the switching unit (6) comprise series connected control transistors (Q2 and Q3) that will be turned on only when the control circuit (2) delivers the wanted output voltage (Vin). The switching unit (6) functions with the voltage formed at the output of the block circuit (6). The switching unit (6) furthermore comprises driver transistors (Qa and Qb) that are turned on in case this voltage reaches the value that can turn on the control transistors (Q2 and Q3). The driver transistors (Qa and Qb) drive the control transistors (Q2 and Q3) respectively. In the case the control transistors (Q2 and Q3) are turned on simultaneously, the supply voltage (Vcc) is applied on the exit of the safety circuit (3). The block circuit (5) outlet is less strained by connecting thus the control transistors (Q2 and Q3) (FIG. 7).

In an embodiment of the present invention, the household appliance (1) wherein the reliability control is implemented in two phases is a cooking device. In this embodiment, in order to provide the temperature control in accordance with the safety requirements, the voltage (Vin) seen at the exit of a heat sensor that measures the temperature of the control circuit (2) is controlled at the safety circuit (3).

In the household appliance (1) of the present invention, a high level protection is provided by implementing safety with simple elements in the safety circuit (3) that maintains the reliability control of the control circuit (2) in two phases. Moreover, since protection is implemented here entirely hardware-wise, complex systems such as the microprocessor are not required.

In the household appliance (1) of the present invention, the safety circuit (3) cuts off output in all kinds of errors that can change the output signal (Vin) of the control circuit (2), thereby shifts the control circuit (2) to the safe mode.

By means of the present invention, a high security household appliance (1) is designed that controls whether a magnitude (pressure, temperature) in the control circuit (2) is within safety limits and in cases of errors in the safety circuit (3) provides the safety of the household appliance (1) as per safety requirements, in other words in case of two errors, implements the safety of the control circuit (2) itself.

The invention claimed is:

1. A household appliance (1) comprising a control circuit (2) that maintains the electronic control and a safety circuit (3) that detects the errors in the control circuit (2) and cuts off the output of the circuit (2) in case an error occurs and characterized by a safety circuit (3) comprising thereby maintains the reliability control of the circuit (2) in two phases by means of a comparator (4) that compares hardware-wise the output voltage (Vin) of the control circuit (2) with a full wave form benchmark, having low ($V_L$) and high ($V_H$) limit values and a block circuit (5) that converts the output signal (V1) of the comparator (4) to supply voltage if within the determined values, and cuts off if outside, and a switching unit (6) connected to the output (V2) of the block circuit (5), actuated with the same variable signal as the control circuit (2), and cuts off the output (Vin) of the control circuit (2) if an unwanted signal is detected at the output (V2) of the block circuit (5).

2. A household appliance (1) as in claim 1, characterized by a safety circuit (3) that comprises a comparator (4) wherein the output voltage will be equal to the benchmark when the output voltage (Vin) of the control circuit (2) is within the limits of the benchmark ($V_L$<Vin<$V_H$) and equal to zero if above (Vin>$V_H$), equal to the supply voltage (Vcc) when below (Vin<$V_L$).

3. A household appliance (1) as in claim 1, characterized by a block circuit (5) disposed at the exit of the comparator (4) and wherein supply voltage (Vcc) is seen at its exit if output voltage (V1) of the comparator (4) is equal to the benchmark, and cuts off the output of the control circuit (2) if different from the benchmark.

4. A household appliance (1) as in claim 1, characterized by a switching unit (6) comprising serially connected control transistors (Q2 and Q3) that are turned on only if of the control circuit (2) delivers the desired output voltage (Vin).

5. A household appliance (1) as in claim 1, which is a cooking device wherein the temperature control is implemented by a safety circuit (3).

6. A household appliance (1) as in claim 5, characterized by a safety circuit (3) that controls the output voltage (Vin) of the temperature sensor which measures the temperature of the control circuit (2).

7. A household appliance (1) as in claim 2, characterized by a block circuit (5) disposed at the exit of the comparator (4) and wherein supply voltage (Vcc) is seen at its exit if output voltage (V1) of the comparator (4) is equal to the benchmark, and cuts off the output of the control circuit (2) if different from the benchmark.

8. A household appliance (1) as in claim 2, characterized by a switching unit (6) comprising serially connected control transistors (Q2 and Q3) that are turned on only if of the control circuit (2) delivers the desired output voltage (Vin).

9. A household appliance (1) as in claim 2, which is a cooking device wherein the temperature control is implemented by a safety circuit (3).

10. A household appliance (1) as in claim 9, characterized by a safety circuit (3) that controls the output voltage (Vin) of the temperature sensor which measures the temperature of the control circuit (2).

11. A household appliance (1) as in claim 3, characterized by a switching unit (6) comprising serially connected control transistors (Q2 and Q3) that are turned on only if of the control circuit (2) delivers the desired output voltage (Vin).

12. A household appliance (1) as in claim 3, which is a cooking device wherein the temperature control is implemented by a safety circuit (3).

13. A household appliance (1) as in claim 12, characterized by a safety circuit (3) that controls the output voltage (Vin) of the temperature sensor which measures the temperature of the control circuit (2).

14. A household appliance (1) as in claim 4, which is a cooking device wherein the temperature control is implemented by a safety circuit (3).

15. A household appliance (1) as in claim 14, characterized by a safety circuit (3) that controls the output voltage (Vin) of the temperature sensor which measures the temperature of the control circuit (2).

16. A household appliance (1) as in claim 7, characterized by a switching unit (6) comprising serially connected control transistors (Q2 and Q3) that are turned on only if of the control circuit (2) delivers the desired output voltage (Vin).

17. A household appliance (1) as in claim 7, which is a cooking device wherein the temperature control is implemented by a safety circuit (3).

18. A household appliance (1) as in claim 17, characterized by a safety circuit (3) that controls the output voltage (Vin) of the temperature sensor which measures the temperature of the control circuit (2).

19. A household appliance (1) as in claim 8, which is a cooking device wherein the temperature control is implemented by a safety circuit (3).

20. A household appliance (1) as in claim 19, characterized by a safety circuit (3) that controls the output voltage (Vin) of the temperature sensor which measures the temperature of the control circuit (2).

* * * * *